Dec. 6, 1966     T. J. MALOTT     3,289,688

FLOW DIVIDER VALVE FOR USE WITH TWO PUMPS

Filed Jan. 16, 1964

*INVENTOR*
THOMAS J. MALOTT

BY *Dodge and Sons*

ATTORNEYS

3,289,688
FLOW DIVIDER VALVE FOR USE WITH TWO PUMPS
Thomas J. Malott, Kalamazoo, Mich., assignor to The New York Air Brake Company, a corporation of New Jersey
Filed Jan. 16, 1964, Ser. No. 338,176
4 Claims. (Cl. 137—114)

This invention relates to flow regulating valves for use in hydraulic systems employing a pair of supply pumps.

One typical system of the type mentioned is the power steering circuit used on motor vehicles. Here, the two supply pumps frequently are of the fixed displacement type and are driven by the vehicle's propulsion engine, so the rate of supply of fluid varies directly with engine speed. Since the steering circuit includes a steering control valve whose output characteristics vary with flow rate, and it is desirable that the operator's "feel" be independent of speed, the circuit must include some means for maintaining substantially constant the rate at which fluid is delivered to the control valve. While various flow regulating valves have been proposed for this service in the past, as far as I am aware none of these is completely satisfactory.

The object of this invention is to provide a simple and relatively inexpensive flow regulating valve for a dual pump system which accepts the fluid supplied by both pumps and establishes in a primary outlet path a substantially constant flow composed of the entire output of one pump and a progressively varying portion of the output of the other pump. The valve is characterized by a single valving element of the sliding plunger type that defines three variable area metering orifices, one orifice being interposed between the primary inlet and outlet and producing a pressure differential that is used to shift the valve plunger in its opposite flow regulating directions, and the other two orifices being interposed between the secondary inlet and the primary and secondary outlets, respectively. The areas of the orifices are varied in such senses that as the delivery rate of the primary pump increases and decreases, respectively, that portion of the output of the secondary pump which is delivered to the secondary outlet also increases and decreases progressively. Thus, the primary outlet path receives fluid at a substantially constant rate. The variable rate flow through the secondary outlet may be passed directly to the reservoir or used to operate some device which does not require a closely controlled rate of supply.

The preferred embodiment of the invention is described herein with reference to the accompanying drawing in which.

Figure 1:
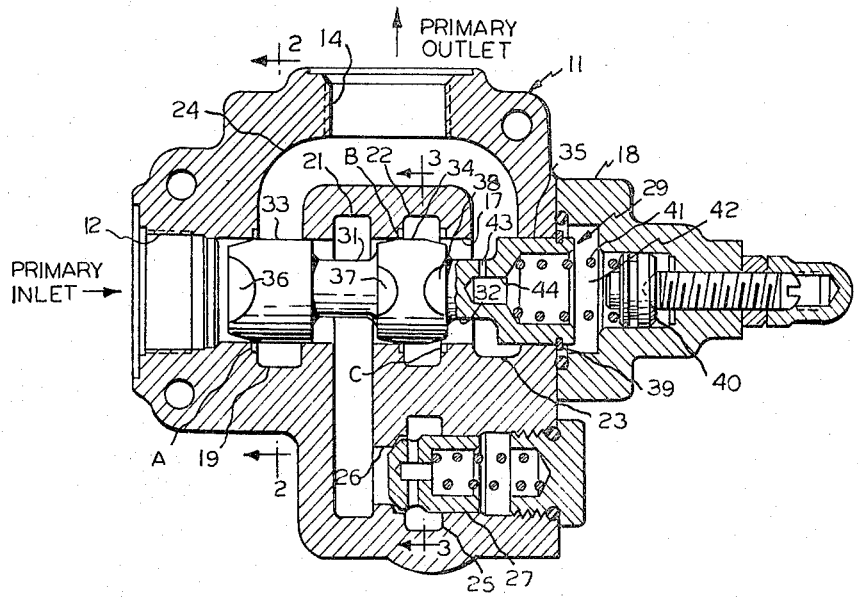
FIG. 1 is a longitudinal sectional view of the improved flow regulating valve.
Figures 2, 3:
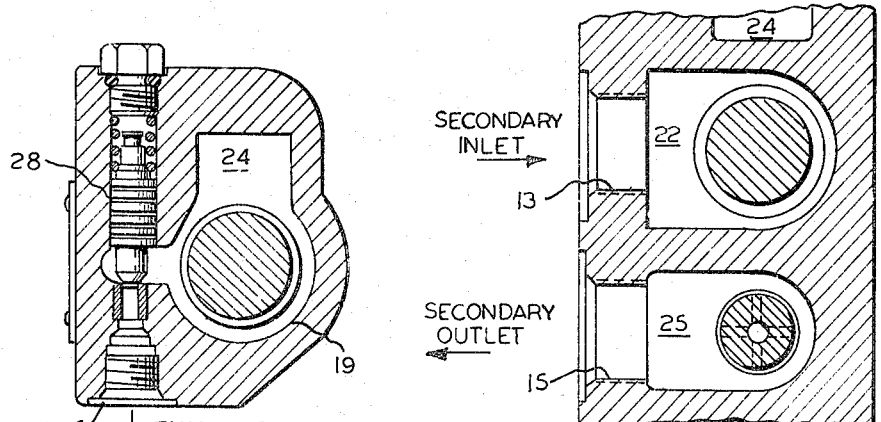
FIG. 2 is a sectional view taken on line 2—2 of FIG. 1.
FIG. 3 is a sectional view taken on line 3—3 of FIG. 1.

As shown in the drawing, the flow regulating valve comprises a housing 11 containing primary and secondary inlet ports 12 and 13, respectively, primary and secondary outlet ports 14 and 15, respectively, an exhaust port 16, and a valve bore 17 whose left end opens into port 12, with which it is aligned, and whose right end is closed by a cap 18. Valve bore 17 is intersected by four longitudinally spaced flow chambers 19, 21, 22 and 23; the chambers 19 and 23 being connected with the primary outlet port 14 by a cored manifold 24, the chamber 21 being connected with the secondary outlet port 15 by cored chamber 25 and drilled passage 26, and the chamber 22 communicating with the secondary inlet port 13. Housing 11 also is provided with a check valve 27 which is arranged to prevent reverse flow from port 15 to chamber 21 through passage 26, and a relief valve 28 which responds to the pressure in the primary outlet path, including chambers 19 and 23, manifold 24 and port 14, and limits this pressure by by-passing fluid to exhaust port 16. In those installations wherein the flow from secondary outlet port 15 is not utilized in a hydraulic actuation circuit this port is connected with a reservoir and check valve 27 may be omitted.

Reciprocable in bore 17 is a valve plunger 29 formed with two annular grooves 31 and 32 that define three lands 33, 34 and 35. The left side of land 33 is provided with four, equispaced, inclined flats 36 which, with the wall of bore 17, define a variable area orifice A that is interposed between primary inlet port 12 and flow chamber 19. The opposite sides of land 34 are provided with similar flats 37 and 38 which, again with the wall of bore 17, define variable area orifices B and C, located, respectively, between flow chambers 21 and 22 and between flow chambers 22 and 23. Valve plunger 29 is biased to the left to the illustrated position, in which snap ring 39 abuts the side of housing 11, by a coil compression spring 41 whose right end is supported by an adjustable seat 40. In that position of the valve plunger, the flow areas of orifices A and B are a minimum, which in the case of orifice B is zero, and the flow area of orifice C is a maximum. The valve plunger 29 is shifted to the right by the pressure differential created by orifice A; the upstream pressure in port 12 acting directly upon the left end of the plunger, and the downstream pressure being transmitted to the chamber 42 at the closed end of bore 17 through restricted passage 43 and axial bore 44 and acting upon the right end of the plunger. As the plunger moves to the right, the flow areas of orifices A and B increase progressively and the flow area of orifice C decreases progressively. When the plunger reaches its extreme rightward position, the flow area of orifice C is zero. It is desired that there be a linear relationship between the position of valve plunger 29 and the flow rate through orifice A. In the preferred embodiment, this can be accomplished by using a spring 41 which has a linear rate, i.e., the force it exerts varies with the first power of its deflection, because the area of orifice A varies directly with the flow rate.

When the improved flow regulating valve is used in a steering circuit, the inlet ports 12 and 13 are connected with the two supply pumps, primary outlet port 14 is connected with the steering control valve, secondary outlet port 15 is connected with either an auxiliary control circuit which does not require a precisely controlled supply or with the reservoir, and exhaust port 16 is connected with the reservoir. The fluid supplied by the primary pump enters inlet port 12 and then passes through orifice A, chamber 19 and manifold 24 to primary outlet port 14. If the propulsion engine is idling, the flow rate through orifice A will be low and the pressure drop across this orifice will not be large enough to cause rightward movement of valve plunger 29. Therefore, the fluid supplied by the secondary pump and which enters inlet port 13 passes through flow chamber 22, orifice C, annular groove 32, chamber 23 and manifold 24 to outlet port 14 and thus is combined with the fluid supplied by the primary pump.

As the speed of the propulsion engine increases, so too does the flow rate through orifice A and the pressure differential between primary inlet port 12 and chamber 42. This causes valve plunger 29 to commence to move to the right against the bias of spring 41 to thereby progressively increase and decrease the flow areas of orifices A and C, respectively, and to open orifice B. This action allows a portion of the fluid delivered by the secondary pump to be diverted to secondary outlet port 15 via orifice B, annular groove 31, flow chamber 21, passage 26, check valve 27, and chamber 25. The parts of the valve are so dimensioned that the amount of fluid diverted to outlet port 15 is approximately equal to the change in the combined output of both pumps attributable to the increase in driving speed. As a result, the rate of flow from outlet port 14 remains substantially constant. When the engine is operating at full speed and the output of each pump is a maximum, valve plunger 29 will have assumed its extreme rightward position in which orifices B and C are fully open and fully closed, respectively, so all of the fluid supplied by the secondary pump will be diverted to the secondary outlet port 15.

As engine speed decreases, spring 41 shifts valve plunger 29 to the left against the net pressure force developed by the pressures in primary inlet port 12 and chamber 42 to thereby progressively decrease the flow areas of orifices A and B and progressively increase the flow area of orifice C. This action permits an increasing portion of the fluid supplied by the secondary pump to be delivered to the primary outlet port 14. When the engine again reaches the idle speed, orifice B will be closed, orifice C will be fully open, and all of the fluid supplied by the secondary pump will be transmitted to the primary outlet port 14.

As stated previously, the drawing and description relate only to the preferred embodiment of the invention. Since changes can be made in the structure of this embodiment without departing from the inventive concept, the following claims should provide the sole measure of the scope of the invention.

What I claim is:

1. A valve comprising
   (a) a housing containing a valve bore;
   (b) five flow passages communicating with the valve bore at longitudinally spaced points, there being a first inlet passage and a first outlet passage, a second outlet passage which communicates with the bore between the first inlet and outlet passages, a second inlet passage which communicates with the bore between the first and second outlet passages, and a third outlet passage that communicates with the bore between the first inlet passage and the second outlet passage;
   (c) a flow passage interconnecting the first and third outlet passages;
   (d) a valve plunger reciprocable in the bore between first and second positions;
   (e) means carried by the valve plunger and the housing defining a variable area orifice in the bore between the first inlet passage and the third outlet passage, the flow area of the orifice increasing progressively as the plunger moves toward the second position;
   (f) means carried by the valve plunger and the housing defining a second variable area orifice in the bore between the second inlet passage and the first outlet passage, the flow area of this orfice being a maximum when the valve plunger is in the first position and decreasing progressively as the plunger moves toward the second position;
   (g) means carried by the valve plunger and the housing defining a third variable area orifice in the bore between the second inlet passage and the second outlet passage, the flow area of this orfice being a maximum when the valve plunger is in the second position and decreasing progressively as the plunger moves toward the first position;
   (h) spring means biasing the valve plunger toward the first position; and
   (i) means carried by the plunger and responsive to the pressure differential across the first orifice for shifting the plunger toward its second position against the bias of the spring means.

2. A valve comprising
   (a) a housing containing a valve bore closed at one end and opening at the other end into a first inlet port, the housing also containing a second inlet port and first and second outlet ports;
   (b) four flow chambers intersecting the bore at longitudinally spaced locations, there being first and third outlet chambers located adjacent the closed and open ends of the bore, respectively, which are connected with the first outlet port, an inlet chamber located between the first and third outlet chambers and connected with the second inlet port, and a second outlet chamber located between the inlet chamber and the third outlet chamber and connected with the second outlet port;
   (c) a valve plunger reciprocable in the bore and having one end which is exposed to the pressure in the first inlet port and an opposite end which together with the closed end of the bore defines a control chamber, the plunger being formed with a pair of end lands and an intermediate land which are separated by a pair of annular grooves,
   (d) one end land being formed to define with the wall of the bore a first variable area orifice located between the first inlet port and the third outlet chamber and the opposite sides of the intermediate land being formed to define with the wall of the bore second and third variable area orifices located, respectively, between the inlet chamber and the first outlet chamber and between the inlet chamber and the second outlet chamber,
   (e) the areas of the first and third orifices increasing progressively as the valve plunger moves toward the closed end of the bore and the area of the second orifice increasing progressively as the valve plunger moves in the opposite direction;
   (f) a spring located in the control chamber and biasing the valve plunger in the direction of the open end of the bore; and
   (g) passage means connecting the control chamber with the first outlet port.

3. A valve as defined in claim 2 including
   (a) an exhaust port formed in the housing;
   (b) an exhaust passage connecting the exhaust port with the first outlet port; and
   (c) a relief valve responsive to the pressure in the first outlet port and controlling flow through the exhaust passage.

4. A valve as defined in claim 3 including a check valve interposed in the connection between the second outlet chamber and the second outlet port and arranged to permit flow toward but not from the port.

References Cited by the Examiner

UNITED STATES PATENTS 2,905,191  9/1959  Vander Kaay _____ 137—117

WILLIAM F. O'DEA, *Primary Examiner.*

H. WEAKLEY, *Assistant Examiner.*